(12) United States Patent
Koopman et al.

(10) Patent No.: US 7,934,866 B2
(45) Date of Patent: May 3, 2011

(54) MIXING DEVICE COMPRISING A PIPE BEND

(75) Inventors: Carlos Nicolaas Jozef Maria Koopman, Heerhugowaard (NL); Ramon Eduard Verhoeven, Heerhugowaard (NL)

(73) Assignee: Bravilor Holding B.V., Heerhugowaard (NL)

( * ) Notice: Subject to any disclaimer, the term of this patent is extended or adjusted under 35 U.S.C. 154(b) by 277 days.

(21) Appl. No.: 12/375,370

(22) PCT Filed: Jul. 26, 2007

(86) PCT No.: PCT/NL2007/050371
§ 371 (c)(1), (2), (4) Date: Jan. 27, 2009

(87) PCT Pub. No.: WO2008/013451
PCT Pub. Date: Jan. 31, 2008

(65) Prior Publication Data
US 2009/0202695 A1    Aug. 13, 2009

(30) Foreign Application Priority Data
Jul. 28, 2006  (NL) ...................................... 2000164

(51) Int. Cl.
*A47J 31/40*    (2006.01)
(52) U.S. Cl. ............... 366/165.3; 366/168.1; 366/171.1; 222/129.1; 222/145.6; 99/300
(58) Field of Classification Search .................... 366/64, 366/134, 165.3, 168.1, 172.1, 262–265, 279, 366/608, 171.1; 426/519; 222/145.5–145.6, 222/235, 129.1; 99/287, 300
See application file for complete search history.

(56) References Cited

U.S. PATENT DOCUMENTS

| | | | | |
|---|---|---|---|---|
| 3,012,763 A * | 12/1961 | Martin | ........................... | 416/222 |
| 3,140,861 A * | 7/1964 | Krup | ........................... | 366/156.1 |
| 3,266,670 A * | 8/1966 | Brooks et al. | .................... | 222/54 |
| 4,185,927 A * | 1/1980 | Uttech | ........................... | 366/131 |
| 4,676,401 A * | 6/1987 | Fox et al. | ........................... | 222/1 |
| 5,918,768 A * | 7/1999 | Ford | ........................... | 222/113 |
| 5,927,553 A * | 7/1999 | Ford | ........................... | 222/129.4 |
| 6,698,625 B2 * | 3/2004 | Ufheil et al. | ................... | 222/190 |
| 6,729,753 B2 * | 5/2004 | Artman et al. | ............. | 366/164.6 |
| 7,059,498 B2 * | 6/2006 | Ufheil et al. | ................... | 222/190 |
| 2003/0150879 A1 * | 8/2003 | Ufheil et al. | ................... | 222/190 |
| 2005/0079265 A1 * | 4/2005 | Ufheil et al. | ................... | 426/569 |
| 2008/0233264 A1 * | 9/2008 | Doglioni Majer | ............ | 426/594 |
| 2009/0202695 A1 * | 8/2009 | Koopman et al. | .............. | 426/519 |
| 2009/0324792 A1 * | 12/2009 | Verhoeven et al. | ........... | 426/519 |
| 2010/0018406 A1 * | 1/2010 | Koopman et al. | ............... | 99/300 |

FOREIGN PATENT DOCUMENTS

| | | |
|---|---|---|
| EP | 1116464 | 7/2001 |
| FR | 2410460 A | 6/1979 |
| WO | 03/068039 | 8/2003 |
| WO | 2004/056246 A1 * | 7/2004 |

* cited by examiner

*Primary Examiner* — Charles E Cooley
(74) *Attorney, Agent, or Firm* — Fliesler Meyer LLP

(57) ABSTRACT

The invention relates to a mixing device for mixing a liquid, such as water, with an instant ingredient to form a beverage. The mixing device comprises a mixing chamber and a rotor. The mixing chamber comprises an inlet chamber, a rotor chamber and a pipe bend. The inlet opening of the pipe bend extends in the horizontal plane. The rotor is provided in the rotor chamber. The internal wall of the pipe bend has, on the side of the outer curve, a planar surface which is defined by a first direction and a second direction. The first direction extends in the horizontal direction and the second direction extends at right angles to the first direction, at an angle to the horizontal plane. The planar surface is situated perpendicularly below the inlet opening of the bend.

15 Claims, 5 Drawing Sheets

US 7,934,866 B2

MIXING DEVICE COMPRISING A PIPE BEND

This application is a national stage application that claims priority under 35 U.S.C. 371 to Patent Cooperation Treaty Application No. PCT/NL2007/050371, entitled "Mixing device comprising a pipe bend," inventors Carlos Nicolaas Jozef Maria Koopman et al., filed Jul. 26, 2007, and which has been published as Publication No. WO2008/013451, which application is herein incorporated by reference.

TECHNICAL FIELD OF THE INVENTION

The present invention relates to the field of preparing an instant beverage. The present invention relates in particular to a mixing device used therefore for mixing a liquid, such as hot or cold water, with an instant ingredient, such as instant powder or instant liquid, to form a beverage.

BACKGROUND OF THE INVENTION

Mixing devices in the field of preparing instant beverages are known. An example which may be mentioned is WO 03/068039.

Such mixing devices are required in order to mix the liquid, usually hot water, with the instant ingredient, which in the case of WO 03/068039 is an instant powder. Referring to said example WO 03/068039, such a mixing device has a mixing chamber containing a rotor. The mixing chamber is usually subdivided into an inlet chamber and a rotor chamber. At the top, the inlet chamber is provided with an access opening through which portions of instant powder are delivered to the inlet chamber. The inlet chamber furthermore has an inlet mouth by means of which the hot water is supplied. When the inlet chamber is round and the inlet is oriented radially, mixing occurs in the inlet chamber as a result of the liquid making a circular motion. From the inlet chamber, the liquid with the instant powder passes to the rotor chamber in which the rotor is located. The rotor is, as is also the case in WO 03/068039, usually arranged so that it rotates about a horizontal axis of rotation. As a result thereof, a pipe bend is usually provided between the inlet chamber and the rotor chamber. The rotor may perform various functions, optionally in combination, and may, partly for this reason, have various forms. One function is to improve the mixing. Another function is foaming up the beverage by mixing in air or by another way. Yet another function is a conveying function. Furthermore, an outlet is connected to the mixing chamber, usually to the rotor chamber near the rotor, in order to discharge the mixture produced, generally into a container, such as a beaker, mug, cup or pot, from which the beverage can be drunk or poured. The outlet is generally horizontally oriented and has a discharge part at the end having an outflow opening which is directed downwards by means of a bend.

The known mixing devices for preparing an instant beverage have various shortcomings, that is to say there are various points which can be improved upon.

A problem which occurs with mixing devices such as those known from WO 03/068039 is that encrustation, that is encrustation of instant ingredient particles, takes place in the pipe bend leading from the inlet chamber to the rotor chamber, in particular in the outer curve thereof. This encrustation results in soiling which is undesirable and has to be removed on a regular basis.

It is an object of the present invention to improve the through-flow in the pipe bend in such a manner that the deposition of particles in said pipe bend are prevented and thereby also to prevent encrustation.

SUMMARY OF THE INVENTION

The above object is achieved according to the invention by providing a mixing device for mixing a liquid, such as hot or cold water, with an instant ingredient, such as an instant powder or instant liquid, to form a beverage, the mixing device comprising:
 a mixing chamber;
 a rotor;
in which the mixing chamber comprises an inlet chamber, a rotor chamber and a pipe bend, in which the pipe bend connects the inlet chamber to the rotor chamber; in which the pipe bend forms a bend with, at the start of the bend, an inlet opening to the inlet chamber and with, at the end of the bend, an outlet opening to the rotor chamber; in which the inlet opening extends in the horizontal plane; in which the inlet chamber, at least near the bottom thereof, is funnel shaped narrowing towards the inlet opening of the pipe bend, and comprises an access opening at the top for the supply of the instant ingredient as well as an inlet mouth for the supply of hot or cold water; in which an outlet duct for discharging the mixture produced is connected to the rotor chamber; and in which the rotor is provided in the rotor chamber; characterized by the fact that the internal wall of the pipe bend, on the side of the outer curve, comprises a planar surface which is defined by a first direction and a second direction; the first direction extending in the horizontal direction and the second direction extending at right angles to the first direction, at an angle to the horizontal plane and from the inlet opening to the outlet opening; the planar surface being situated perpendicularly below the inlet opening; and the upper side of the planar surface adjoining the inlet opening.

Providing a planar surface on the side of the outer curve in the pipe bend, which planar surface extends at an angle with respect to the horizontal plane from the inlet opening to the outlet opening, results in the flow velocity in this outer curve being relatively high, thus preventing the deposition of particles, in particular instant ingredient particles. The planar surface which is situated perpendicularly below the inlet opening furthermore results in the particles which fall down through the inlet opening and land on this straight surface easily sliding downwards along this straight, planar surface insofar as they are not already entrained by the relatively high flow velocity. In this case, it is important that the upper side of the planar surface adjoins the inlet opening so that the particles which drop down are immediately entrained from the start of the bend. The particles entering the pipe bend on the side of the outer curve are thus not deposited in the vertical direction, or hardly deposited in the vertical direction at all.

It should be noted that FIG. 2 of WO 03/068039 in the pipe bend, on the side of the outer curve, has an incline which, at 29, adjoins the inlet opening of the pipe bend and the bottom of the inlet chamber. However, this is not a planar surface. The figure in question shows a cross section of a conical first section of the pipe bend. It is therefore not more than an oblique line, and the surface of the inner curve in this case, in the tangential direction, is curved and not planar. This results in different flow effects. The same is true for the bottom side of the pipe bend from FIG. 2 of WO 03/068039, which is also an incline, but again this shows a cross-sectional view of a conical section, which forms part of a surface curved in the tangential direction instead of a planar surface. With this known mixing device, the deposition and encrustation phenomena therefore also occur in practice.

It should furthermore be noted that EP 1.116.464 by the Applicant discloses a mixing device which also has an incline at the bottom of the pipe bend. The outlet opening of the pipe bend is in this case determined, as it were, by the sieve 22 and the horizontal inlet opening of the pipe bend here touches the upper side of the sieve 22 or is situated even higher. Firstly, the figure here, as can clearly be seen and has also been mentioned in the text, is a highly diagrammatical view and, secondly, the upper side of this incline very clearly does not adjoin the inlet opening of the pipe bend. Furthermore, it is also true here that there is no evidence to suggest that this incline forms part of a planar surface. Rather, this incline is part of a conical surface and will then be curved on the inside of the pipe bend.

In this case, it is furthermore advantageous if the upper side of the planar surface substantially adjoins the bottom of the inlet chamber. This means that the inlet opening of the pipe bend substantially lies in the conical bottom of the inlet chamber. Thus, it is already immediately ensured when the particles leave the inlet chamber that those particles which pass through the pipe bend along the side of the outer curve are passed directly along the planar inclined surface and do not fall downwards in a vertical direction first.

In this case, it is furthermore advantageous if the bottom side of the planar surface substantially adjoins the outlet opening of the pipe bend. The planar surface then extends, as it were, through the entire pipe bend. The planar surface may thus comprise the entire side of the outer curve of the pipe bend. By ensuring that the bottom side of the planar surface adjoins the outlet opening, a planar surface is provided along the entire side of the outer curve. Thus, the result is that particles travelling along the side of the outer curve of the pipe bend pass through the pipe bend at a relatively high speed.

According to a further embodiment of the invention, the angle of inclination of the second direction is in the range of 35° to 55°. At such an angle, firstly, the passage in the pipe bend is sufficiently large to allow the liquid to pass through and, secondly, the planar surface is sufficiently steep to prevent deposits and encrustation. More preferably, the angle of inclination of the second direction in this connection is in the range of 40° to 50°. In particular, an angle of inclination of the second direction of approximately 45° was found to lead to very good results.

According to the invention, it is furthermore advantageous if the vertical projection of the planar surface on the inlet opening overlaps at least 50%, for example 70% or more, of the inlet opening. This overlap will in particular be more than 80%, for example 90% or more. This contributes to a relatively strong current along the outer curve of the pipe bend. It should be noted here that when the pipe bend more or less tapers in the downward direction along the sides, this will obviously result in an overlap of less than 100%.

According to a further embodiment of the invention, the pipe bend forms a bend of approximately 90°.

According to the invention, it is furthermore advantageous if the internal wall of the pipe bend, on the side of the inner curve, has an angular transition between an inflow zone of the pipe bend, which inflow zone adjoins the inlet opening, and an outflow zone of the pipe bend, which outflow zone adjoins the outlet opening. Such an angular transition causes turbulence-like phenomena in the flow area in the pipe bend, which further promotes the action of the planar surface against deposits and encrustation. The angular transition may in this case be the centre of an arcuate arc edge, with both ends of said arc edge adjoining the planar surface. The entire arcuate arc edge may in this case be angular. It is particularly advantageous in this case if the angular transition forms an acute angle (i.e. an angle of 90° or less).

According to a further advantageous embodiment, the mixing device is of the type in which the rotor is rotatable about a horizontal axis of rotation.

According to a further aspect, the present invention relates to a beverage-making device for preparing a hot instant beverage, the beverage-making device comprising:
at least one mixing device according to the invention;
a water supply system for the supply of hot or cold water to the inlet mouth of the at least one mixing device;
at least one storage container for instant ingredient;
an ingredient supply duct which connects the storage container to the access opening of the at least one mixing device.

According to yet a further aspect, the present invention relates to the use of a mixing device according to the invention for preparing a hot or cold instant beverage, such as coffee, soup, hot cocoa, tea, bouillon, lemonade or fruit juice.

EMBODIMENT OF THE INVENTION

The present invention will be explained below with reference to an embodiment illustrated in the drawing, in which.

Figure 1:
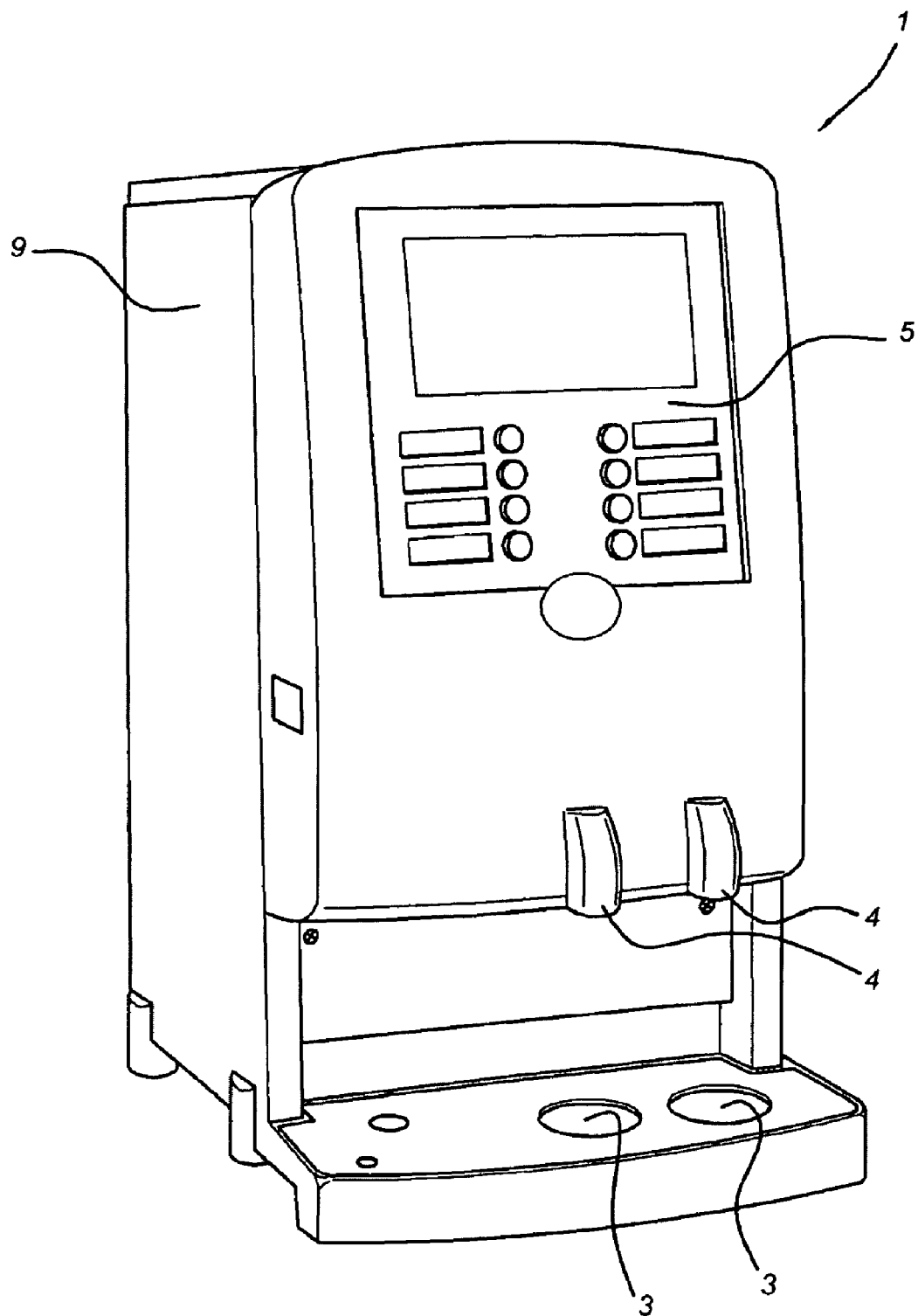
FIG. 1 shows a diagrammatic perspective view of a beverage-making device according to the invention.
Figure 2:
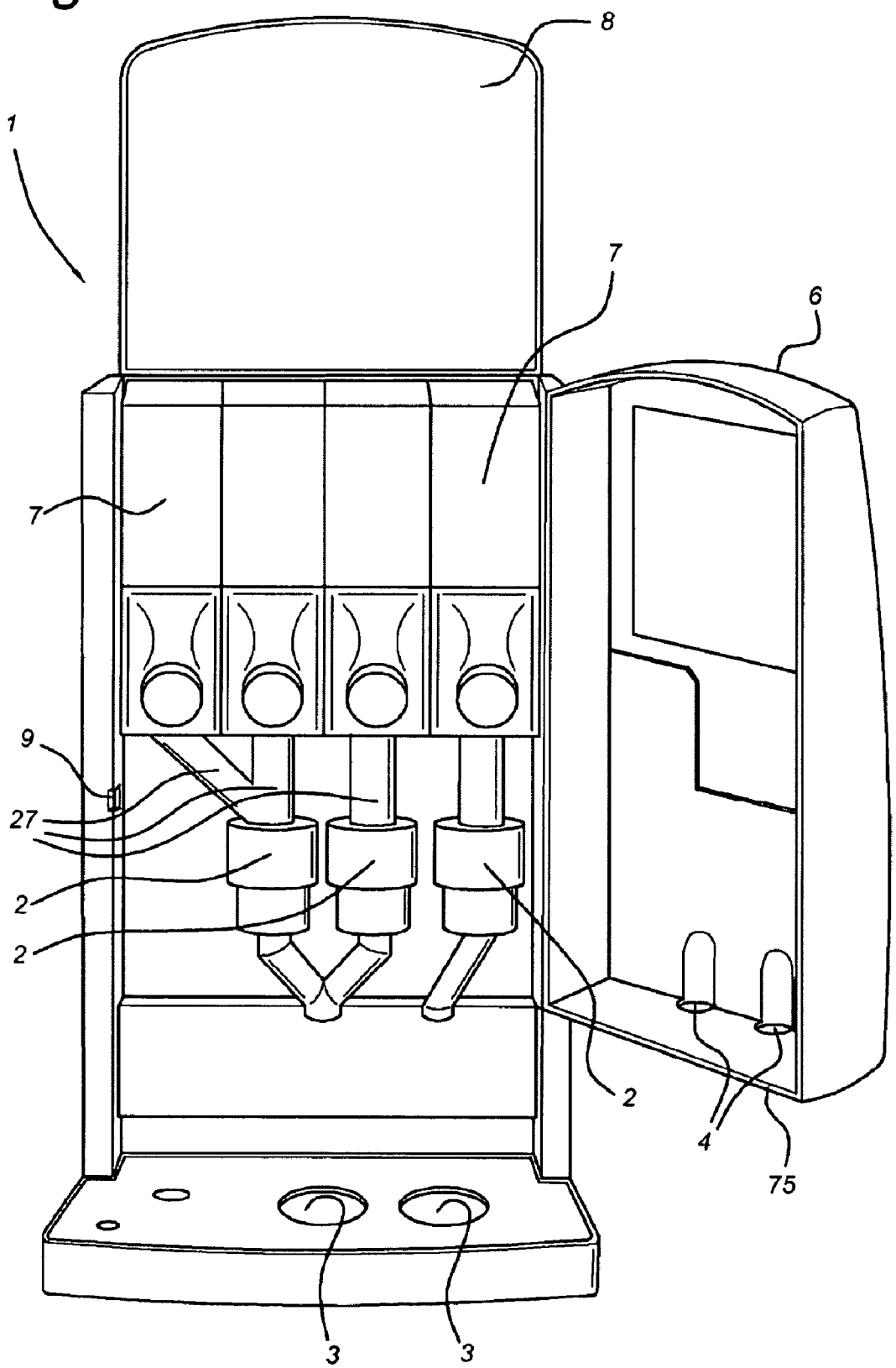
FIG. 2 shows a diagrammatic perspective view of the beverage-making device according to the invention in an open position.

FIGS. 1 and 2 show diagrammatic perspective views of a beverage-making device 1 according to the invention. This beverage-making device comprises a substantially closed cabinet 9, a hinged cover 8, and a hinged door 6. A control panel 5 is provided on the door 6, by means of which control panel 5 the user can choose a specific beverage. At the front, at the bottom, two positioning locations 3 for a cup or mug are provided on a panel. Above each positioning location 3, a dispensing point 4 for the beverage is provided in the door 5.

When the door is open, see FIG. 2, 4 storage containers 7 can be seen. Each storage container may contain a different base material for preparing an instant beverage. Thus, for example, the left-hand container 7 may contain milk powder, the second container from the left instant coffee powder for cappuccino, the third container from the left instant coffee powder for standard or espresso coffee, and the right-hand container instant soup powder. The containers may also contain instant liquid instead of instant powder, and it is also possible for containers with instant powder to be provided in addition to containers with instant liquid.

Beneath the storage containers 7, there are 3 mixing devices according to the invention which are connected to the storage containers via powder supply ducts. It should be noted that a beverage-making device according to the invention may also be provided with fewer or more mixing devices according to the invention.

In accordance with standard NEN-EN-IEC60335-2-75, three so-called "areas" can be distinguished in the beverage-making device according to the invention, i.e. the so-called "user area" (article 3.109 of the standard), the so-called "maintenance area" (article 3.110 of the standard), and the so-called "service area" (article 3.111 of the standard).

The user area is the space where the user obtains the beverage. The user area is thus essentially the area which is accessible from the outside, as illustrated in FIG. 1.

The maintenance area is the space where the standard, usually daily, maintenance is carried out, in particular refilling the storage containers. In order to give access to the maintenance area, a hinged door 6 is provided at the front of the beverage-making device 1 and a hinged cover 8 is provided at the top of the beverage-making device 1. The hinged cover 8 can incidentally also be omitted.

The so-called service area is situated in the space enclosed by the cabinet-shaped frame 9. This service area is only accessible to technical maintenance personnel. The service area contains electrical parts, such as the power supply, electric motors, heating means, etc.

Figure 3:
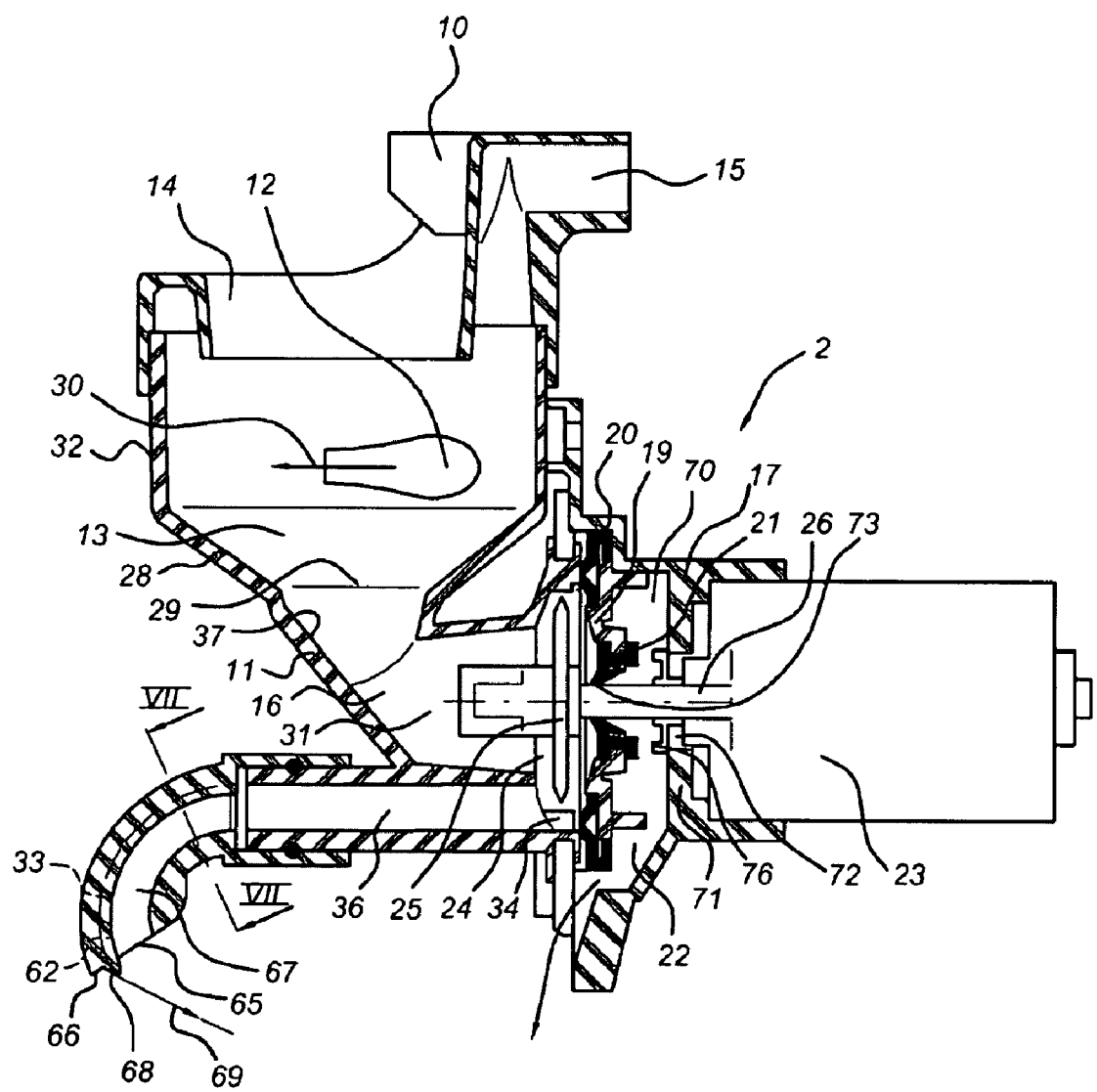
FIG. 3 shows a diagrammatic cross section of a mixing device according to the invention.

FIG. 3 shows a cross section of a mixing device according to the invention. This mixing device 2 will initially be discussed in general terms without yet going into detail about the invention itself.

The mixing device 2 comprises a mixing chamber 13, 16, 14. The mixing chamber is subdivided into an inlet chamber 13, a rotor chamber 14 and a pipe bend 16 which connects the inlet chamber 13 to the rotor chamber 24. The rotor chamber 24 contains a rotor 25. The rotor 25 is driven by an electric motor 23, or electromotor for short. This electromotor 23 is placed outside the rotor chamber and connected to the rotor 25 by means of a drive shaft 26.

An extractor hood 10 is provided on the inlet chamber 13. This extractor hood 10 delimits an access opening 14 to the inlet chamber 13. The extractor hood 10 furthermore has a connection 15 for connecting to an extraction duct. As can be seen in FIG. 2, one or more powder supply ducts 27 end in the access opening 14. In use, instant powder, at least portions of instant powder, are supplied to the inlet chamber 13 via these powder supply ducts 27. In the inlet chamber 13, there is furthermore an inlet mouth 12 for the supply of hot water. This hot water is supplied in the horizontal direction, in the direction indicated by arrow 30, in order to flow out in the inlet chamber. Due to the fact that the inlet chamber is bowl-shaped, the hot water will thus carry out a swirling motion. The instant powder, which is fed into the inlet chamber via access opening 14, will consequently already be mixed with the hot water in the inlet chamber and be able to completely or partially dissolve in the process.

Due to the presence of hot water, there will be vapour in the inlet chamber 13 and due to the presence of the instant powder, there will also be fine powder particles floating in the vapour in the inlet chamber 13. It will be clear that this vapour should not enter the powder supply ducts 27 and the extractor hood 10 has been provided for this very reason. In use, air will be extracted from the inlet chamber 13 via the connection 15, so that vapour and fine powder particles are removed to the surrounding area.

The bottom 28 of the inlet chamber 13 is of an, as it were, funnel like design, in this case about conical, in order to end up centrally at the inlet opening 29 of the pipe bend 16. This pipe bend 16 bends through approximately 90° in order to end at the outlet opening 31 of the pipe bend 16 in the rotor chamber 24.

The mixture undergoes further treatment by the rotor 25 in the rotor chamber 24. According to the invention, this rotor can be of varying design. The rotor illustrated in FIG. 3 is substantially planar and disc-shaped. However, the rotor may also be of a different design, for example similar to the rotor of EP 639,924 or similar to the rotor of WO 03/068039.

At the rear, the rotor chamber 24 is delimited by a rear wall 19, which is also referred to in this patent application by the term first wall part. This first wall part 19 is provided with a shaft seal 21 through which the drive shaft 26 protrudes into the rotor chamber 24.

The rear wall 19 is accommodated in the motor support 17 which supports the electromotor 23. During fitting, the motor support 17 is attached to the front wall of the cabinet 9. The motor support 17 furthermore supports the housing 32 in which the mixing chamber is accommodated. The rear wall 19 is provided with a flexible seal 20 along the periphery against which a rib 34 of the mixing chamber housing 32 forms a seal.

The mixing chamber housing 32 is furthermore provided with an outlet duct 36, 33 for discharging the mixture formed in the mixing chamber 13, 16, 24. The outlet duct 36, 33 comprises a straight segment 36 and a discharge part 33 by means of which the mixture is dispensed in the cup or beaker. Referring to FIG. 2, it will be clear that a pipe or otherwise a duct may be provided between the straight segment 36 and the discharge duct 33 if the mixing device 2 is not provided perpendicularly above the positioning location.

Although the mixing device according to the invention has been described above as a mixing device for mixing an instant powder with a liquid, in particular water, it should be noted that the mixing device according to the invention may very well be of the type in which an instant liquid—in practice often referred to as 'liquid ingredient'—is mixed with water. The viscosity of such a liquid ingredient can, according to the invention, vary from low to high—and may even be extremely viscous. According to the invention, such a liquid ingredient may, for example, be a concentrated extract or condensed liquid. It will be clear to the person skilled in the art that the supply to the mixing chamber may be designed differently in the case of a liquid ingredient. The extractor hood can be omitted completely (but can also remain in place). The shape of the inlet chamber may be different (but may also be approximately the same, if desired).

Furthermore, it should be noted that the mixing device according to the invention can be used for preparing both hot and cold beverages. According to the invention, hot beverages can be prepared both from instant powder and from an instant liquid, or so-called 'liquid ingredient'. The same applies to cold beverages. According to the invention, cold beverages can also be prepared both from an instant powder and from an instant liquid, or so-called 'liquid ingredient'.

The invention, and more particularly a number of improvements which the invention provides to the mixing device according to the invention, will be discussed in more detail below. These improvements are in four different areas. A first improvement of the mixing device according to the invention relates to the pipe bend 16. A second improvement of the mixing device according to the invention relates to improving the operation of the rotor 25. A third improvement of the mixing device according to the invention relates to the outlet duct 36, 33. A fourth improvement of the mixing device according to the invention relates to reducing the number of defects of the electromotor 23.

Figure 4:
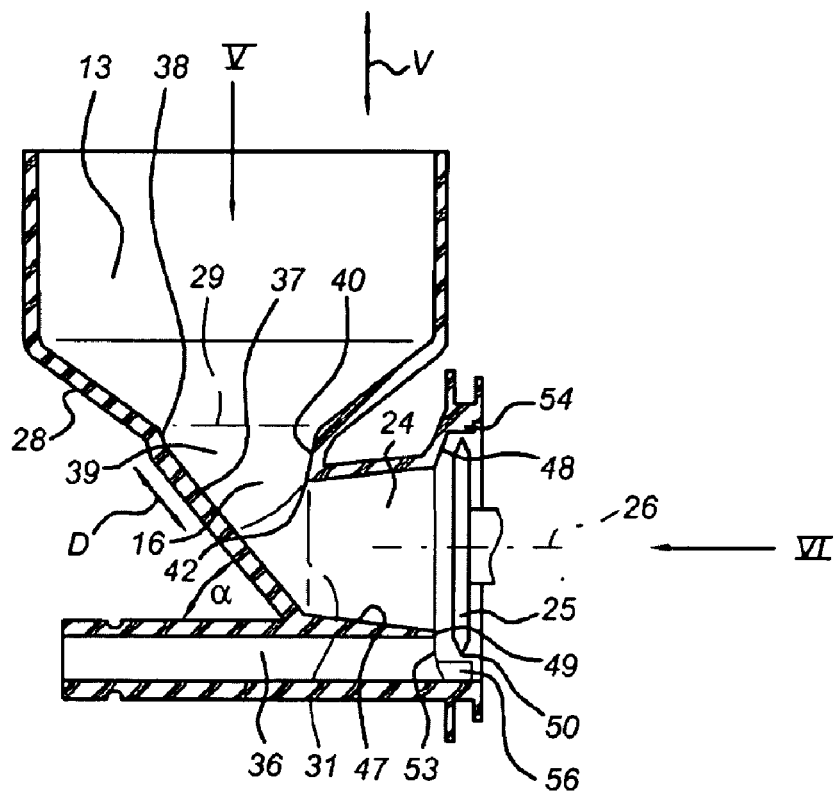
FIG. 4 shows a diagrammatic cross section of a detail of the mixing device according to FIG. 3.
Figure 5:
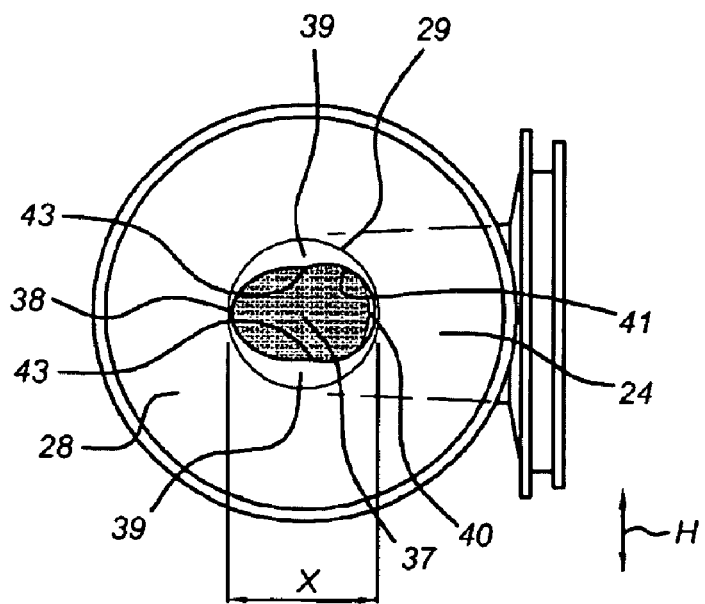
FIG. 5 shows a diagrammatic top view in the direction indicated by arrow V in FIG. 4 of the detail from FIG. 4.
Figure 6:
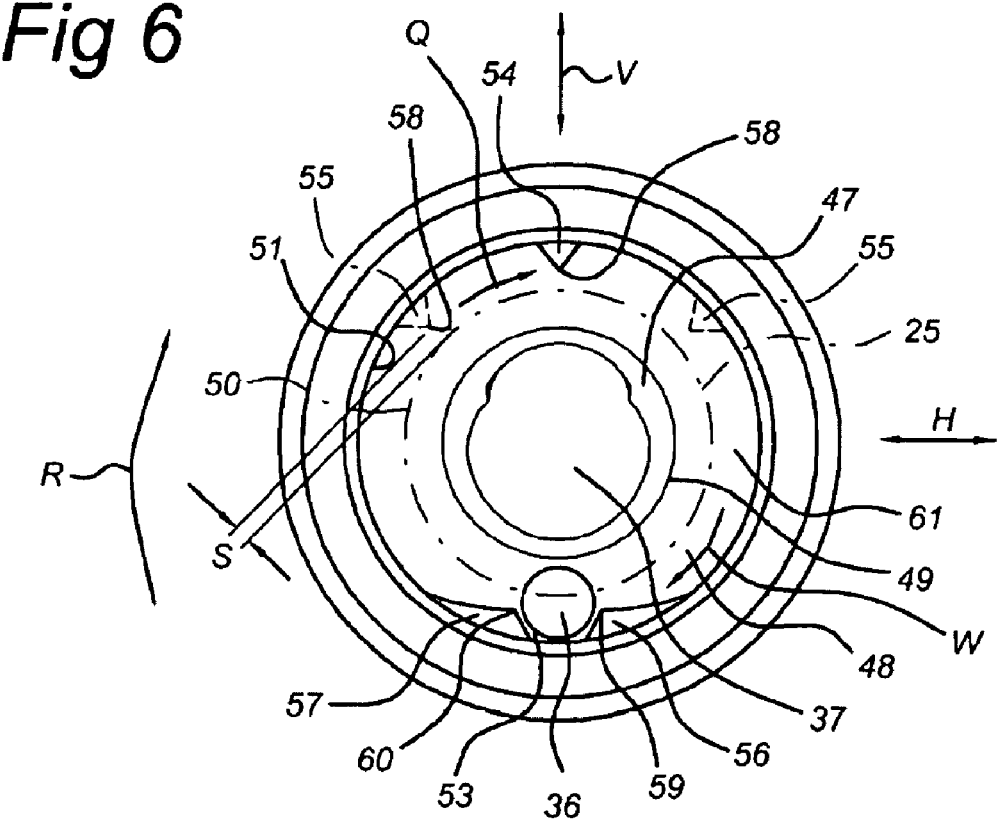
FIG. 6 shows a diagrammatic top view in the direction indicated by arrow VI in FIG. 4 and FIG. 5 of the detail from FIG. 4.

As can partly be seen in FIG. 3, the side of the outer curve 11 of the pipe bend 16 is designed as a planar surface 37 with the pipe bend 16 according to the invention. This planar surface 37 is shown in more detail in the diagrammatic FIGS. 4, 5 and 6 which only show a detail of the unit. FIG. 4 in this case shows a diagrammatic cross-sectional representation according to that of FIG. 3. FIG. 5 shows a view in the direction indicated by arrow V in FIG. 4 and FIG. 6 shows a view in the direction indicated by arrows VI in FIGS. 4 and 5. In FIG. 5, the planar surface 37 has been made easier to distinguish by shading it. In FIG. 6, the rotor has only been indicated by means of a dashed circle 25 in order to indicate its position and, apart from that, to provide a clear view in the rotor chamber 24 to the inclined surface 37.

Referring to FIGS. 4, 5 and 6, it can be seen that the entire side of the outer curve of the pipe bend 16 is designed as a planar surface 37. The conical bottom 28 of the inlet chamber 13 has an opening in the centre, which opening also forms the inlet opening 29 of the pipe bend 16. With the interposition of a small conical transition edge 38—which is approximately 1-2 mm high in the vertical direction—this planar surface 37 here not only adjoins the inlet opening 29 of the pipe bend but also the bottom 28 of the inlet chamber 13.

Referring to FIG. 5, it can be seen that, due to the fact that the entry side of the pipe bend 16 tapers slightly, there are tapering, in particular conical wall zones 39 on either side of the pipe bend which run obliquely and steeply from the bottom 28 of the inlet chamber 13 towards the otherwise planar surface 37. Such a tapering curved surface 40 can also be seen on the side of the inner curve, see FIGS. 4 and 5.

The planar surface 37 is defined by a first direction H, which runs in the horizontal direction (see the double arrow H in FIG. 5) and a second direction D, which runs at right angles to this first direction H. This second direction is indicated in FIG. 4 by means of the double arrow D. The planar surface 37 is at an angle $\alpha$ with respect to the horizontal plane. In the embodiment as illustrated in FIGS. 3-6, $\alpha$ is 45°. The double arrow D is thus at an angle of 45° with respect to both the double arrow H which indicates the horizontal direction and the double arrow V which indicates the vertical direction. In this case, according to the invention the expression planar surface is understood to mean that the surface is planar in the extending direction D and also in the extending direction H. In the extending directions H and D, the surface 37 is therefore not curved, but straight over a certain distance larger than 0 cm (zero cm), such as over a distance of at least 0.5 cm.

FIG. 4 shows that, on the side of the inner curve, the pipe bend has an angular transition 42. This angular transition 42 forms the centre of an arcuate arc edge 41 (see FIG. 5) which is of an angular design overall. This arc edge 41 is C-shaped and has two free ends 43 by which the arc edge 41 adjoins the planar surface 37 (see FIG. 5).

In order to illustrate the overall position of the planar surface 37 in more detail, the planar surface 37 is shaded in FIG. 5.

FIG. 5, which is a view in the direction indicated by arrow V in FIG. 4, also shows the so-called vertical projection of the planar surface 37 on the inlet opening 29. This is that section of the planar surface which in the view from FIG. 5 is actually visible and is not hidden by other parts. FIG. 5 further shows that the planar surface 37 overlaps more than 50% of the inlet opening 29. This overlap amounts to considerably more than 50%, even more than 70%.

The planar surface 37, which is provided on the side of the outer curve of the pipe bend 16, has the advantage that the liquid flowing through the pipe bend will travel at relatively great speed along the planar surface which counteracts deposits and encrustation of particles in the outer curve of the pipe bend and can even prevent it almost entirely. Such deposits and encrustation are a problem with the known mixing devices and mean that these known mixing devices have to be cleaned at regular intervals.

For further clarification of the drawings in FIGS. 4, 5 and 6, it should be noted that the rotor chamber 24 is delimited upstream of the rotor 25 by a conically widening wall part 47 which, near an edge 49, joins with a widened section in which the rotor 25 is accommodated. The conical wall part 47 and the delimiting edge 49 are indicated in FIG. 4 and in FIG. 6.

Below, the improvement of the operation of the rotor will be discussed in more detail, in particular with reference to FIGS. 4 and 6.

The rotor 25 which is rotatable about axis of rotation 26 during rotation defines a surface of revolution 50 along the circumference of the rotor. The mixing chamber, in particular the rotor chamber 24, has a circumferential wall zone 51 having a substantially circular cross section. This circumferential wall zone 51 surrounds the surface of revolution 50 of the rotor.

In order to improve the operation of the rotor 25, according to the invention at least one rotor rib 54, 55, 56, 57 is provided on the circumferential wall zone 51. This at least one rotor rib extends from the circular circumferential wall zone 51 in the direction of the surface of revolution 50 of the rotor 25.

In FIG. 6, five of these rotor ribs are illustrated. Two of the rotor ribs, both denoted by reference numeral 55, are indicated by means of dashed lines in order to clearly indicate that the number of rotor ribs can vary according to the invention. The rotor ribs 55 can also in any case readily be omitted. Furthermore, it should be noted that the rotor ribs 56 and 57 form a pair which is provided on either side of the inlet 53 of the outlet duct 36. Rotor ribs 56, 57 may be provided, optionally in combination with other rotor ribs. One or more rotor ribs 54, 55 may also be provided, optionally in combination with rotor ribs 56, 57.

Referring to FIG. 6 and assuming that the direction of rotation of the rotor 25 is in the direction indicated by arrow R, the operation of the rotor ribs 54 and optional rotor ribs 55 is as follows. Due to the centripetal forces, the liquid is forced to the outside by the rotor 25 and runs along the inner wall of the mixing chamber in the circumferential wall zone 51. When this liquid, which now runs in the circumferential wall zone 51 along the wall of the mixing chamber, encounters the rotor rib 54 or 55, this liquid will be returned in the direction of the rotor 25 by the rotor rib 54. This course along the circumferential wall zone 51 and return movement of the liquid stream is indicated by means of arrow Q. This return movement results in the liquid being forced into closer contact with the rotor, which thus leads to an improvement in the operation of the rotor. As has been indicated by means of arrow W at rotor rib 56, the operation of rotor rib 56 is similar in this respect.

As can be seen in FIG. 4, the rotor ribs 54 and 56, as well as rotor rib 57 and the optional rotor ribs 55 preferably extend along the entire axial length of the rotor 25.

FIG. 6 furthermore shows that the rotor ribs 54, 55, 56 and 57 all have a substantially triangular cross-sectional shape. This results in the liquid flowing towards the rotor in the direction indicated by arrows Q and W being passed along the inclined surface in the direction of the rotor, so that, as it comes away from the rotor ribs, it has a movement component which is partly in the direction of the rotation of the rotor. This makes it easier to carry this returned liquid along and prevents liquid from collecting along the circumferential wall zone 51.

FIG. 6 furthermore shows that the rotor ribs 54, 55, 56 and 57 have an angular edge 58, 59, 60 extending in the axial direction. This promotes the formation of turbulences in the liquid when moving away from the respective rotor ribs.

The height of the rotor ribs 54, 55, 56 and 57, viewed in the radial direction of the rotor, is in the range from 1 to 3 mm and is approximately 2 mm in FIG. 6. The radial tolerance S between the surface of revolution 50 and the respective rotor ribs is in particular in the range from 0.5 to 2 mm and is approximately 1 mm in FIG. 6, but may also be 2 mm. This prevents an inaccurately dimensioned rotor or a rotor which has not been centered correctly on the rotor shaft from hitting the rotor ribs.

The inlet 53 of the outlet segment 36 is provided near the surface of revolution of the rotor and, more precisely, at least with this exemplary embodiment, partly along the axial front surface of the rotor. Directly adjacent to the inlet 53 of the outlet 36, this inlet 53 is provided on both sides with rotor ribs 56 and 57. Providing rotor ribs 56 and 57 on either side of the inlet 53 of the outlet 36 not only results in the liquid being returned to the rotor at these rotor ribs but also has the effect that this liquid does not flow away so readily via the outlet. This results in the liquid remaining in the rotor chamber for longer. It should be noted that although the inlet 53 of the outlet 36 extends here in the axial plane, this inlet may readily also extend in the tangential plane, in which case the outlet duct will then at least initially bend away in the radial direction.

Figure 7:
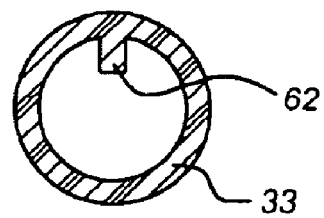
FIG. 7 shows a cross-sectional view in the direction indicated by arrows VII in FIG. 3.
Figure 8:
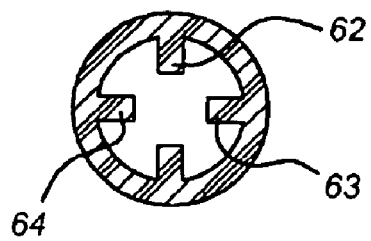
FIG. 8 shows an alternative cross-sectional view corresponding to that of FIG. 7.

Referring in particular to FIGS. 3, 7 and 8, an improvement to the outlet duct will now be discussed in more detail. It is known precisely due to the desired operation of the rotor that the liquid flowing through the outlet duct 36, 33 swirls, which leads to turbulences when it flows into a cup or beaker. In order to prevent these turbulences, it is known to provide the discharge mouth, that is to say the end of the discharge, with specific features. The inventors have now found that the turbulent flow can readily be turned into a smooth flow by providing a rib in the outlet duct 36, 33 which extends in the longitudinal direction of the outlet duct. This rib has a guiding effect on the flow through the outlet duct and smoothes this flow out. Surprisingly, in this case, the quality of the liquid, such as foam which is produced therein and the like, is not noticeably affected, or hardly noticeably affected at all.

In the exemplary embodiment shown in the drawings, this at least one rib is arranged in the discharge part 33. The discharge part 33 from FIG. 3 is shown in cross section in FIG. 7. As can be seen here, a rib 62 is arranged on the inside of the outlet duct, in this case therefore inside the discharge part 33. This rib 62 extends in the longitudinal direction of the outlet duct. In particular, the rib 62 extends parallel to the longitudinal direction of the outlet duct. Furthermore, the rib 62 preferably extends along the entire curve of the discharge part. Since the latter is in this case a pipe bend 33, the rib 62 will therefore then follow the curve, as can also be seen in FIG. 3. It was found to be particularly advantageous to arrange this at least one rib 62 on the section of the pipe bend 33 which is situated nearest to the side of the outer curve. The liquid is forced to the outside in the pipe bend and will thus be subjected to the guiding action of rib 62 to the greatest possible extent.

FIG. 8 shows an alternative embodiment of the discharge part 33 in cross section. In this case, three additional ribs 63, 64 are provided in addition to rib 62 from FIG. 7. Thus, a cross-shaped cross-sectional shape is achieved.

As can be seen in FIG. 3, the outlet duct is composed of a first section 36 which is integrally formed with the housing 32 of the mixing chamber 13, 16, 24, and a second section 33, the discharge part. If desired, a third section may also be provided between the first section 36 and the second section 33. Such a third section may, for example, be a pipe if the discharge 33 is not directly connected to the first section 36. By not providing the first section 36 with guiding ribs, a universal housing part can be used and the ribs in the second or third section can be specifically adapted to the desired purpose, in particular to the liquid to be passed through the outlet duct. The requirements placed on the guiding ribs are different for a highly foaming liquid to those for a liquid which produces little foam or a soup liquid.

The discharge part 33 in FIG. 3 comprises a bend so that the direction changes from horizontally flowing to substantially vertically flowing. The outflow end 65 of the discharge part 33 is turned downward. FIG. 3 furthermore shows that the side of the outer curve 66 of the outflow end 65 is lower than the side of the inner curve 67. This promotes a smooth flow from the discharge part.

FIG. 3 furthermore shows that the rib 62 projects from the outflow end 65 in a downward direction with an end 68. This assists the last remains of liquid in coming out of the discharge part after a beaker or cup has been filled and thus limits dripping. Said dripping may in this case be limited even further by the projecting rib end 68 tapering conically in the direction of the longitudinal axis of the outlet duct, as is indicated by means of arrow 69 in FIG. 3.

Below, extending the service life of the electromotor 23 will be discussed in more detail, substantially with reference to FIGS. 2 and 3.

As can be seen in FIG. 3, a rear wall 19 of the rotor chamber 24 is situated behind the rotor 25. This rear wall is in this connection referred to as first wall part. This first wall part 19 is provided with a shaft seal 21 through which the drive shaft 26 protrudes into the rotor chamber. As is known per se, there is an intermediate space 70 behind the first wall part 19. In devices known from the prior art, this intermediate space 70 is a substantially closed space with two passages, i.e. the passage in the shaft seal 21 and another passage in a second wall part 71 via which the shaft enters the intermediate space 70. When the shaft seal 21 starts to leak as a result of wear or through another cause, the intermediate space 70 will fill up. After some time, the liquid will then end up in the electromotor and the latter will fail.

The present invention now proposes to provide an indicator system which gives an indication as soon as liquid has entered the intermediate space 70. This then makes it possible to call a maintenance engineer at an early stage so that the shaft seal can be replaced instead of the electromotor 23 which would otherwise have failed after some time. Such an indicator system can be produced by means of sensors. However, according to the invention this indicator system is produced in a very simple manner and such that it is fail-safe by providing the intermediate space 70 with a leakage drain 22 at the bottom side, which discharges liquid which has entered the intermediate space to an indicator, in the form of a simple collecting surface or a simple collecting tray. The liquid then flows via the leakage drain 22 to a collecting surface. In the present case, the collecting surface is simply the bottom 75 of the door at the front. When the user opens the door 6 in order to refill the containers for instant powder, he/she will automatically see whether any liquid has leaked. In that case, the user has to contact maintenance staff who can then replace the shaft seal 21. As all this takes place at an early stage, the beverage-making device 1 can continue to operate as normal and does not have to be taken out of service in order to wait for maintenance staff to attend to the problem.

According to the invention, it is advantageous if the shaft seal 21 is fitted in the mixing device according to the invention as a separate part, optionally in combination with the entire first wall part 19, so as to facilitate replacement of the shaft seal 21.

It will in itself be clear that a collecting surface or, if desired, a collecting tray for leaked liquid can also be attached to the mixing device itself and thus forms part of the mixing device itself instead of forming part of the beverage-making device.

Examples of beverages which may be prepared using a mixing device according to the invention or a beverage-making device according to the invention, respectively, include: tea, iced tea, frappé coffee (iced coffee), (cold) lemonade, soup, bouillon, (artificial) fruit juice, health drinks—such as AA-drink®. All of these beverages can in principle either be made using an instant powder or using an instant liquid—so-called 'liquid ingredient'.

The invention claimed is:

1. A Mixing device for mixing a liquid, such as water, with an instant ingredient to form a beverage, the mixing device comprising:
   a mixing chamber;
   a rotor;
   wherein the mixing chamber comprises an inlet chamber, a rotor chamber and a pipe bend;
   wherein the pipe bend connects the inlet chamber to the rotor chamber;
   wherein the pipe bend forms a bend with, at the start of the bend, an inlet opening to the inlet chamber and with, at the end of the bend, an outlet opening to the rotor chamber;
   wherein the inlet opening extends in the horizontal plane;
   wherein the inlet chamber, at least near the bottom thereof, is funnel shaped narrowing towards the inlet opening of the pipe bend, and comprises an access opening at the top for the supply of the instant ingredient as well as an inlet mouth for the supply of water;
   wherein an outlet duct for discharging the mixture produced is connected to the rotor chamber; and
   wherein the rotor is provided in the rotor chamber;
   characterized in that
      an internal wall of the pipe bend, on the side of the outer curve, comprises a planar surface which is defined by a first direction (H) and a second direction (D);
      the first direction (H) extending in the horizontal direction and the second direction (D) extending at right angles to the first direction (H), at an angle to the horizontal plane and from the inlet opening to the outlet opening;
      the planar surface being situated perpendicularly below the inlet opening; and
      the upper side of the planar surface adjoining the inlet opening.

2. The Mixing device according to claim 1, in which the upper side of the planar surface adjoins the bottom of the inlet chamber.

3. The Mixing device according to claim 1, in which the bottom side of the planar surface adjoins the outlet opening.

4. The Mixing device according to claim 1, in which an angle of inclination (a) of the second direction is in the range from 35° to 55°.

5. The Mixing device according to claim 1, in which an angle of inclination (a) of the second direction is in the range from 40° to 50°.

6. The Mixing device according to claim 1 claims, in which an angle of inclination (a) of the second direction is approximately 45°.

7. The Mixing device according to claim 1, in which a vertical projection of the planar surface on the inlet opening overlaps at least 50%, for example 60% or more, of the inlet opening.

8. The Mixing device according to claim 1, in which the pipe bend forms a bend of approximately 90°.

9. The Mixing device according to claim 1, in which the internal wall of the pipe bend, on a side of an inner curve, has an angular transition between an inflow zone of the pipe bend, which inflow zone adjoins the inlet opening, and an outflow zone of the pipe bend, which outflow zone adjoins the outlet opening.

10. The Mixing device according to claim 9, in which the angular transition is the centre of an arcuate arc edge, with ends of said arc edge adjoining the planar surface.

11. The Mixing device according to claim 9, in which the angular transition forms an acute angle.

12. The Mixing device according to claim 1, in which the rotor is rotatable about a horizontal axis of rotation.

13. The Mixing device according to claim 1, furthermore comprising a motor which is connected to the rotor for drive purposes.

14. A method for preparing an instant beverage, such as coffee, soup, hot cocoa, tea, bouillon, lemonade or fruit juice utilizing the mixing device of claim 1.

15. A Beverage-making device for preparing an instant beverage, the beverage-making device comprising:
   at least one mixing device comprising
      a mixing chamber,
      a rotor,
      wherein the mixing chamber comprises an inlet chamber, a rotor chamber and a pipe bend,
      wherein the pipe bend connects the inlet chamber to the rotor chamber,
      wherein the pipe bend forms a bend with, at the start of the bend, an inlet opening to the inlet chamber and with, at the end of the bend, an outlet opening to the rotor chamber,
      wherein the inlet opening extends in the horizontal plane,
      wherein the inlet chamber, at least near the bottom thereof, is funnel shaped narrowing towards the inlet opening of the pipe bend, and comprises an access opening at the top for the supply of the instant ingredient as well as an inlet mouth for the supply of water,
      wherein an outlet duct for discharging the mixture produced is connected to the rotor chamber, and
      wherein the rotor is provided in the rotor chamber,
      characterized in that
         an internal wall of the pipe bend, on the side of the outer curve, comprises a planar surface which is defined by a first direction (H) and a second direction (D); the first direction (H) extending in the horizontal direction and the second direction (D) extending at right angles to the first direction (H), at an angle to the horizontal plane and from the inlet opening to the outlet opening, the planar surface being situated perpendicularly below the inlet opening, and the upper side of the planar surface adjoining the inlet opening,
   a water supply system for the supply of water to the inlet mouth of the at least one mixing device;
   at least one storage container for instant ingredient; and
   an ingredient supply duct which connects the storage container to an access opening of the at least one mixing device.

* * * * *